M. H. GRABOWSKY.
TRANSMISSION MECHANISM FOR AUTOMOBILES.
APPLICATION FILED JUNE 21, 1911.
1,017,407.
Patented Feb. 13, 1912.
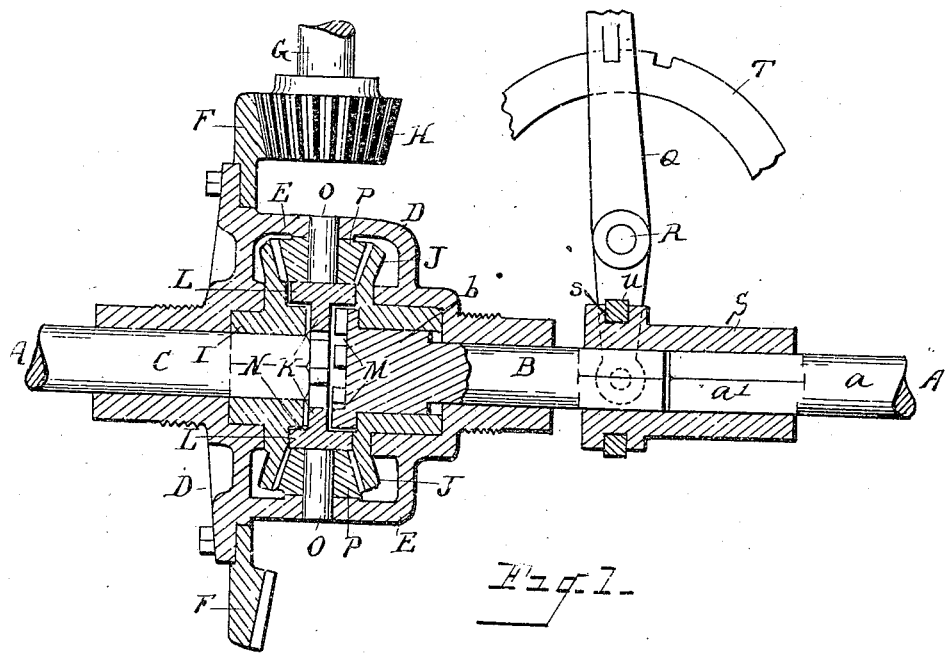
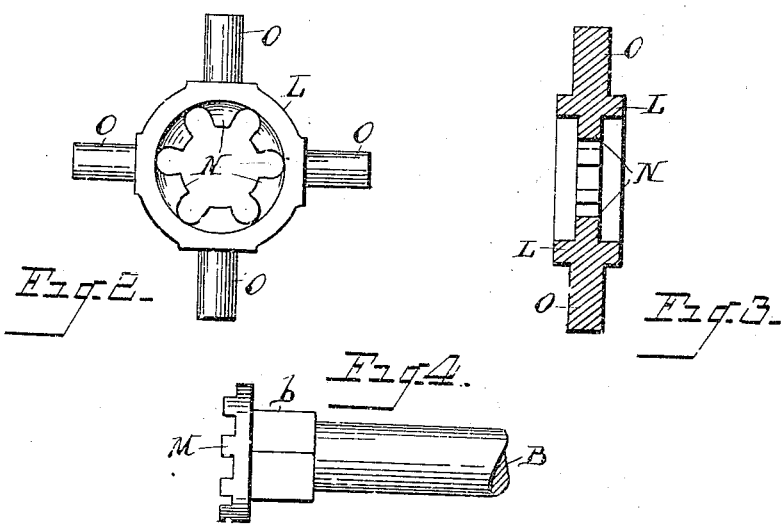
Witnesses
O. B. Baenziger.
V. C. Spratt.
Inventor
Max H. Grabowsky
Parker & Burton
Attorneys

UNITED STATES PATENT OFFICE.

MAX H. GRABOWSKY, OF DETROIT, MICHIGAN.

TRANSMISSION MECHANISM FOR AUTOMOBILES.

1,017,407.  Specification of Letters Patent.  Patented Feb. 13, 1912.

Application filed June 21, 1911. Serial No. 634,555.

*To all whom it may concern:*

Be it known that I, MAX H. GRABOWSKY, citizen of the United States, residing at Detroit, county of Wayne, State of Michigan, have invented a certain new and useful Improvement in Transmission Mechanism for Automobiles, and declare the following to be a full, clear, and exact description of the same, such as will enable others skilled in the art to which it pertains to make and use the same, reference being had to the accompanying drawings, which form a part of this specification.

My invention relates to transmission mechanism for automobiles and consists in the improvements hereinafter described and pointed out in the claims.

In the accompanying drawings:—Figure 1, is a longitudinal section of a part of the mechanism embodying my invention. Fig. 2, is a detail plan view of a ring forming part of the equalizing gear mechanism. Fig. 3, is a central section of the ring of Fig. 2. Fig. 4, is a detail view of an end of a portion of the shaft.

A A is a shaft through which the power is transmitted to the driving wheels of an automobile. In this case the shaft A A represents the counter shaft upon the ends of which, not shown, are sprocket wheels from which the power is transmitted to the driving wheels of the vehicle. The shaft A is made up of three parts $a$ B and C. The parts B and C are adjacent at their inner ends and are united by an equalizing gear D D of which equalizing gear, E is the casing and F a bevel gear wheel secured to the casing D.

G, indicates the end of the power shaft and H is a bevel gear wheel on the shaft G, its teeth engaging the gear F to rotate the casing E.

I, is a bevel gear wheel on the inner end of the portion C of the shaft A A, and J is a bevel gear wheel on the inner end of the portion B of the shaft A A. The gear wheel I is fixed upon the shaft C and the gear wheel J is fitted upon a squared portion $b$ of the portion B of the shaft A A.

L, is a ring concentric with the shaft A A and carrying arbors O extending radially from its periphery upon which arbors are pivoted bevel gear wheels P which latter engage the gear wheels I and J. The arbors O extend into the casing E so that when said casing is rotated motion is imparted to the gear wheels I and J and their respective shafts while leaving said shafts or portions of the shaft A A free to turn independently.

N, are teeth formed in an annular web left in the ring L and M are teeth on the inner end of the portion B of the shaft A A.

Q, is a shifting lever pivoted to the stationary support at R.

S, is a sleeve fixed upon the portion B of the shaft A A and having a square bore which fits upon the squared portion $a^1$ of the portion $a$ of the shaft A A.

$s$ is a groove in the periphery of the sleeve S and $u$ is a ring in said groove. The lower end of the lever Q is pivoted to the ring $u$.

T, is a quadrant by means of which the shifting lever Q can be adjusted to any desired position.

The operation of the above described device is as follows:—In the ordinary operation, the shaft G is driven rotating the casing E of the equalizing gear D D and driving both parts of the shaft A A and both driving wheels while leaving said driving wheels free to turn independently, but should it be desired to move the driving wheels simultaneously the shaft B is caused to slide inward by the shifting lever Q, the sleeve S sliding along the squared portion $a^1$ of the portion $a$ of the shaft A A. When the said portion B has been shifted to the inner end of its travel, its teeth engage the teeth N in the ring L and the portions B and C of the shaft A A are bound together through the equalizing gear mechanism so that both drivers are moved simultaneously. To disconnect the drivers so that they may be driven with an equal force by independent motion, the portion B is again moved outward, the sleeve S sliding along the portion $a$ of the shaft A A as before described. The ring L is generally a forging and the dies are so formed as to leave a thin web extending around the inner wall of said ring and in this web teeth N are formed.

What I claim is:—

1. In a transmission mechanism two portions of a shaft an equalizing gearing having a ring L uniting the portions of said shaft, said ring being provided with teeth, the inner end of one of said shaft portions being provided with teeth and means for moving said portion of said shaft longitudinally to engage and disengage said teeth for the purpose described.

2. In a transmission mechanism, two shaft portions having an equalizing gearing uniting said shaft portions and provided with a ring L having an internal web, said web being provided with teeth formed therein and means for engaging one of said shaft portions with said teeth.

3. In a transmission mechanism, two shaft portions having an equalizing gearing uniting said shaft portions, and provided with a ring L having an internal web, said web being provided with teeth formed therein, the inner end of one of said shaft portions being provided with teeth and means for moving said shaft portion longitudinally to engage the teeth upon its end with the teeth in said web and to disengage the same.

In testimony whereof, I sign this specification in the presence of two witnesses.

MAX H. GRABOWSKY.

Witnesses:
THOMAS H. MILLAR,
ELLIOTT J. STODDARD.